(12) United States Patent
Yang et al.

(10) Patent No.: US 11,696,313 B2
(45) Date of Patent: Jul. 4, 2023

(54) SIDELINK SENSING AND RESOURCE ALLOCATION ENHANCEMENT FOR POWER SAVING

(71) Applicant: QUALCOMM Incorporated, San Diego, CA (US)

(72) Inventors: Wei Yang, San Diego, CA (US); Seyedkianoush Hosseini, San Diego, CA (US); Peter Gaal, San Diego, CA (US); Wanshi Chen, San Diego, CA (US); Hwan Joon Kwon, San Diego, CA (US); Krishna Kiran Mukkavilli, San Diego, CA (US); Seyed Ali Akbar Fakoorian, San Diego, CA (US); Yuchul Kim, San Diego, CA (US); Juan Montojo, San Diego, CA (US); Tingfang Ji, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 96 days.

(21) Appl. No.: 17/244,673

(22) Filed: Apr. 29, 2021

(65) Prior Publication Data
US 2021/0352650 A1 Nov. 11, 2021

Related U.S. Application Data

(60) Provisional application No. 63/020,351, filed on May 5, 2020.

(51) Int. Cl.
*H04W 72/04* (2023.01)
*H04W 4/40* (2018.01)
*H04W 72/02* (2009.01)
*H04W 72/51* (2023.01)
*H04W 72/0453* (2023.01)
(Continued)

(52) U.S. Cl.
CPC ........... *H04W 72/51* (2023.01); *H04W 72/02* (2013.01); *H04W 72/0446* (2013.01); *H04W 72/0453* (2013.01); *H04W 72/52* (2023.01)

(58) Field of Classification Search
None
See application file for complete search history.

(56) References Cited

U.S. PATENT DOCUMENTS

| | | | |
|---|---|---|---|
| 2020/0092685 A1* | 3/2020 | Fehrenbach | H04W 36/18 |
| 2020/0107303 A1* | 4/2020 | Hahn | H04W 72/042 |

(Continued)

*Primary Examiner* — Sai Aung
(74) *Attorney, Agent, or Firm* — Patterson + Sheridan, L.L.P.

(57) ABSTRACT

Certain aspects of the present disclosure provide techniques for identifying, from a resource pool allocated for sidelink communications between UEs, a first number of resources for transmissions from the first UE to a second UE based on a set of one or more parameters shared between the first UE and the second UE and identifying, from the resource pool, a second number of resources for transmissions from the second UE to the first UE based on the shared set of one or more parameters. The first UE may communicate with the second UE using the first and the second number of resources and avoid using the remaining available resources for power saving. For example, the first UE and the second UE may avoid sidelink communications on time slots on which no subchannels belong to either the first subset or second number of the resources.

29 Claims, 12 Drawing Sheets

(51) Int. Cl.
*H04W 72/0446* (2023.01)
*H04W 72/52* (2023.01)

(56) References Cited

U.S. PATENT DOCUMENTS

| | | | |
|---|---|---|---|
| 2020/0205165 A1* | 6/2020 | Huang | H04L 1/1861 |
| 2020/0314960 A1* | 10/2020 | Basu Mallick | H04W 72/14 |
| 2021/0219268 A1* | 7/2021 | Li | H04L 1/08 |
| 2021/0243701 A1* | 8/2021 | Hong | H04W 52/383 |
| 2021/0266868 A1* | 8/2021 | Shin | H04L 1/0061 |
| 2021/0306824 A1* | 9/2021 | Li | H04L 1/1887 |
| 2022/0117017 A1* | 4/2022 | Lee | H04W 76/15 |

* cited by examiner

SIDELINK SENSING AND RESOURCE ALLOCATION ENHANCEMENT FOR POWER SAVING

CROSS-REFERENCE TO RELATED APPLICATION

This application claims benefit of and priority to U.S. Provisional Patent Application No. 63/020,351, filed May 5, 2020, which is assigned to the assignee hereof and herein incorporated by reference in its entirety as if fully set forth below and for all applicable purposes.

BACKGROUND

Field of the Disclosure

Aspects of the present disclosure relate to wireless communications, and more particularly, to device-to-device sidelink communication.

Description of Related Art

Wireless communication systems are widely deployed to provide various telecommunication services such as telephony, video, data, messaging, broadcasts, etc. These wireless communication systems may employ multiple-access technologies capable of supporting communication with multiple users by sharing available system resources (e.g., bandwidth, transmit power, etc.). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

In some examples, a wireless multiple-access communication system may include a number of base stations (BSs), which are each capable of simultaneously supporting communication for multiple communication devices, otherwise known as user equipments (UEs). In an LTE or LTE-A network, a set of one or more base stations may define an eNodeB (eNB). In other examples (e.g., in a next generation, a new radio (NR), or 5G network), a wireless multiple access communication system may include a number of distributed units (DUs) (e.g., edge units (EUs), edge nodes (ENs), radio heads (RHs), smart radio heads (SRHs), transmission reception points (TRPs), etc.) in communication with a number of central units (CUs) (e.g., central nodes (CNs), access node controllers (ANCs), etc.), where a set of one or more DUs, in communication with a CU, may define an access node (e.g., which may be referred to as a BS, 5G NB, next generation NodeB (gNB or gNodeB), transmission reception point (TRP), etc.). A BS or DU may communicate with a set of UEs on downlink channels (e.g., for transmissions from a BS or DU to a UE) and uplink channels (e.g., for transmissions from a UE to BS or DU).

These multiple access technologies have been adopted in various telecommunication standards to provide a common protocol that enables different wireless devices to communicate on a municipal, national, regional, and even global level. NR (e.g., new radio or 5G) is an example of an emerging telecommunication standard. NR is a set of enhancements to the LTE mobile standard promulgated by 3GPP. NR is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL). To these ends, NR supports beamforming, multiple-input multiple-output (MIMO) antenna technology, and carrier aggregation.

Sidelink communications are communications from one UE to another UE. As the demand for mobile broadband access continues to increase, there exists a need for further improvements in NR and LTE technology, including improvements to sidelink communications. Preferably, these improvements should be applicable to other multi-access technologies and the telecommunication standards that employ these technologies.

SUMMARY

The systems, methods, and devices of the disclosure each have several aspects, no single one of which is solely responsible for its desirable attributes. After reading the section entitled "Detailed Description" one will understand how the features of this disclosure provide advantages that include improved device-to-device communications in a wireless network.

Certain aspects of this disclosure provide a method for wireless communication by a first user equipment (UE) for sidelink communication with other user equipments (UEs). The method generally includes identifying, from a resource pool allocated for sidelink communications between UEs, a first plurality of resources for transmissions from the first UE to a second UE based on a set of one or more parameters shared between the first UE and the second UE. The method includes identifying, from the resource pool, a second plurality of resources for transmissions from the second UE to the first UE based on the shared set of one or more parameters. The method further includes communicating with the second UE using the first plurality of resources and the second plurality of resources.

Certain aspects of this disclosure provide an apparatus for wireless communications by a first UE. The apparatus includes a memory and at least one processor coupled to the memory. The at least one processor is configured to identify, from a resource pool allocated for sidelink communications between UEs, a first plurality of resources for transmissions from the first UE to a second UE based on a set of one or more parameters shared between the first UE and the second UE; identify, from the resource pool, a second plurality of resources for transmissions from the second UE to the first UE based on the shared set of one or more parameters; and communicate with the second UE using the first plurality of resources and the second plurality of resources.

Certain aspects of this disclosure provide an apparatus for wireless communications by a first UE. The apparatus includes means for identifying, from a resource pool allocated for sidelink communications between UEs, a first plurality of resources for transmissions from the first UE to a second UE based on a set of one or more parameters shared between the first UE and the second UE; means for identifying, from the resource pool, a second plurality of resources for transmissions from the second UE to the first UE based on the shared set of one or more parameters; and means for communicating with the second UE using the first plurality of resources and the second plurality of resources.

Certain aspects of this disclosure provide a non-transitory computer readable medium storing instructions that when executed by a user equipment (UE) as discussed herein cause the UE to: identify, from a resource pool allocated for sidelink communications between UEs, a first plurality of resources for transmissions from the first UE to a second UE based on a set of one or more parameters shared between the first UE and the second UE; identify, from the resource pool, a second plurality of resources for transmissions from the second UE to the first UE based on the shared set of one or more parameters; and communicating with the second UE using the first plurality of resources and the second plurality of resources.

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
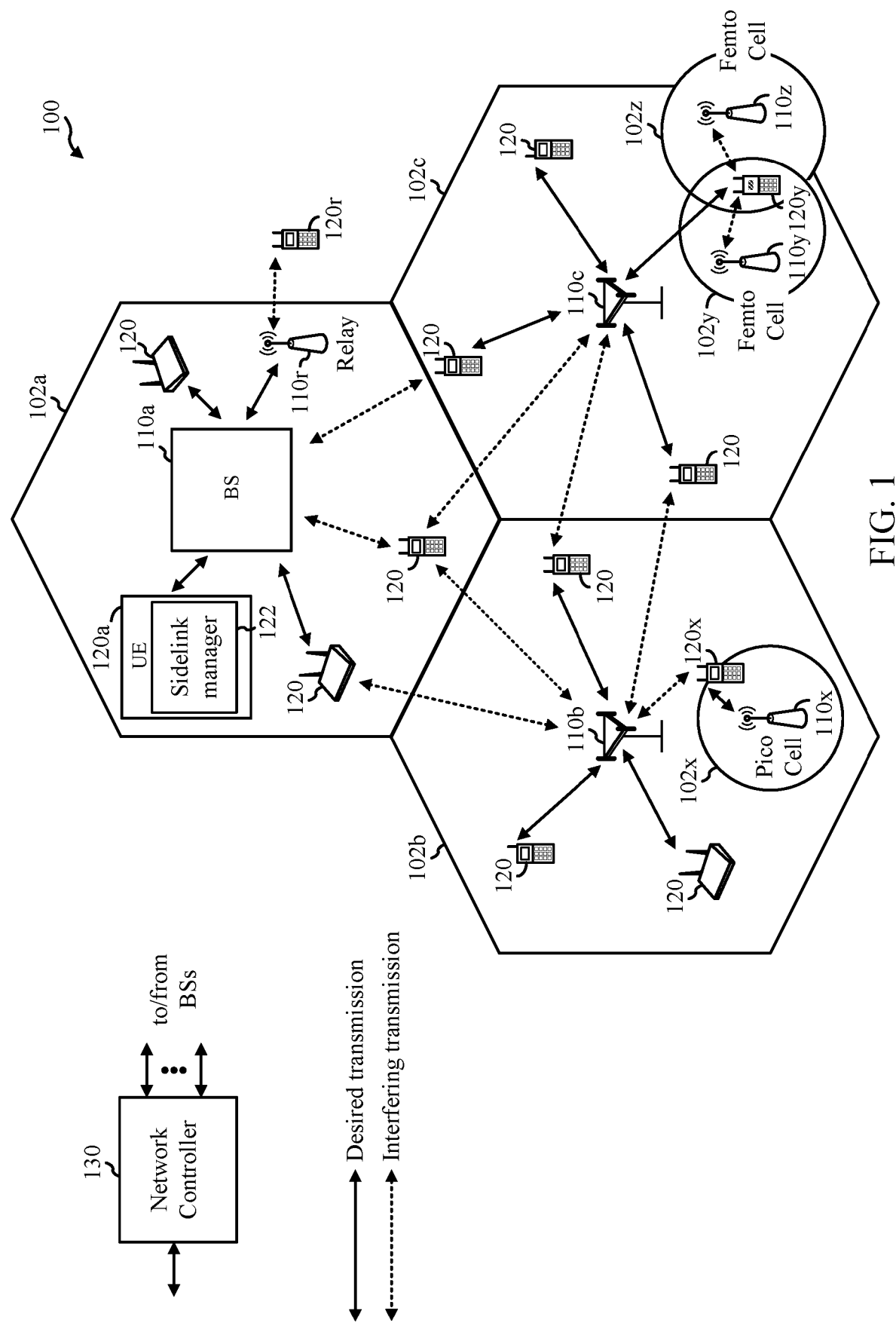
FIG. 1 is a block diagram conceptually illustrating an example telecommunications system, in accordance with certain aspects of the present disclosure.

Aspects of the present disclosure provide apparatus, methods, processing systems, and computer readable mediums for sidelink sensing and resource allocation enhancement for power saving. For example, the techniques disclosed herein include identifying, by a first user equipment (UE) from a resource pool allocated for sidelink communications between UEs, a first plurality of resources for transmissions from the first UE to a second UE based on a set of one or more parameters shared between the first UE and the second UE. The first UE may also identify, from the resource pool, a second plurality of resources for transmissions from the second UE to the first UE based on the shared set of one or more parameters. The first UE then communicates with the second UE using the first plurality of resources and the second plurality of resources. As such, power savings may be achieved in time slots outside of the first or the second plurality of resources.

Previous sidelink communications, such as vehicle to everything (V2X), have little concerns for power consumption because each vehicle includes an onboard generator. As battery powered devices, such as smartphones or the like, use sidelink communications more often, such as in public safety and commercial use cases, reducing unnecessary power consumption has become an important aspect of sidelink communications. In some aspects of the present disclosure, the UE may save power by using only a subset of the resource pool and stay in a sleep or inactive state over the remaining portion of the resource pool.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

The techniques described herein may be used for various wireless communication technologies, such as LTE, CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS).

New Radio (NR) is an emerging wireless communications technology under development in conjunction with the 5G Technology Forum (5GTF). 3GPP Long Term Evolution (LTE) and LTE-Advanced (LTE-A) are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, while aspects may be described herein using terminology commonly associated with 3G and/or 4G wireless technologies, aspects of the present disclosure can be applied in other generation-based communication systems, such as 5G and later, including NR technologies.

New radio (NR) access (e.g., 5G technology) may support various wireless communication services, such as enhanced mobile broadband (eMBB) targeting wide bandwidth (e.g., 80 MHz or beyond), millimeter wave (mmW) targeting high carrier frequency (e.g., 25 GHz or beyond), massive machine type communications MTC (mMTC) targeting non-backward compatible MTC techniques, and/or mission critical targeting ultra-reliable low-latency communications (URLLC). These services may include latency and reliability requirements. These services may also have different transmission time intervals (TTI) to meet respective quality of service (QoS) requirements. In addition, these services may co-exist in the same subframe.

FIG. 1 illustrates an example wireless communication network 100 in which aspects of the present disclosure may be performed. For example, one or more UEs 120a of FIG. 1 may be configured to perform operations described below with reference to FIG. 10 to determine resources to use for sidelink communications.

As illustrated in FIG. 1, the wireless communication network 100 may include a number of base stations (BSs) 110a-z (each also individually referred to herein as BS 110 or collectively as BSs 110) and other network entities. In aspects of the present disclosure, a roadside service unit (RSU) may be considered a type of BS, and a BS 110 may be referred to as an RSU. A BS 110 may provide communication coverage for a particular geographic area, sometimes referred to as a "cell", which may be stationary or may move according to the location of a mobile BS 110. In some examples, the BSs 110 may be interconnected to one another and/or to one or more other BSs or network nodes (not shown) in wireless communication network 100 through various types of backhaul interfaces (e.g., a direct physical connection, a wireless connection, a virtual network, or the like) using any suitable transport network.

In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BSs for the femto cells 102y and 102z, respectively. A BS may support one or multiple cells. The BSs 110 communicate with user equipment (UEs) 120a-y (each also individually referred to herein as UE 120 or collectively as UEs 120) in the wireless communication network 100. The UEs 120 (e.g., 120x, 120y, etc.) may be dispersed throughout the wireless communication network 100, and each UE 120 may be stationary or mobile.

According to certain aspects, the UEs 120 may be configured to determine resources to use for sidelink communications (with another UE). As shown in FIG. 1, the UE 120a includes a sidelink manager 122. The sidelink manager 122 may be configured to transmit a sidelink communication to another UE, in accordance with aspects of the present disclosure.

Wireless communication network 100 may also include relay stations (e.g., relay station 110r), also referred to as relays or the like, that receive a transmission of data and/or other information from an upstream station (e.g., a BS 110a or a UE 120r) and sends a transmission of the data and/or other information to a downstream station (e.g., a UE 120 or a BS 110), or that relays transmissions between UEs 120, to facilitate communication between devices.

A network controller 130 may couple to a set of BSs 110 and provide coordination and control for these BSs 110. The network controller 130 may communicate with the BSs 110 via a backhaul. The BSs 110 may also communicate with one another (e.g., directly or indirectly) via wireless or wireline backhaul.

The UEs 120 (e.g., 120x, 120y, etc.) may be dispersed throughout the wireless communication network 100, and each UE may be stationary or mobile. A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, which may be narrowband IoT (NB-IoT) devices.

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a "resource block" (RB)) may be 12 subcarriers (or 180 kHz). Consequently, the nominal Fast Fourier Transfer (FFT) size may be equal to 128, 256, 512, 1024 or 2048 for system bandwidth of 1.25, 2.5, 5, 10, or 20 megahertz (MHz), respectively. The system bandwidth may also be partitioned into subbands. For example, a subband may cover 1.08 MHz (i.e., 6 resource blocks), and there may be 1, 2, 4, 8, or 16 subbands for system bandwidth of 1.25, 2.5, 5, 10 or 20 MHz, respectively.

While aspects of the examples described herein may be associated with LTE technologies, aspects of the present disclosure may be applicable with other wireless communications systems, such as NR. NR may utilize OFDM with a CP on the uplink and downlink and include support for half-duplex operation using TDD. Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells.

In some examples, access to the air interface may be scheduled. A scheduling entity (e.g., a BS) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. In some examples, a UE may function as a scheduling entity and may schedule resources for one or more subordinate entities (e.g., one or more other UEs), and the other UEs may utilize the resources scheduled by the UE for wireless communication. In some examples, a UE may function as a scheduling entity in a peer-to-peer (P2P) network, and/or in a mesh network. In a mesh network example, UEs may communicate directly with one another in addition to communicating with a scheduling entity.

In FIG. 1, a solid line with double arrows indicates desired transmissions between a UE and a serving BS, which is a BS designated to serve the UE on the downlink and/or uplink. A finely dashed line with double arrows indicates interfering transmissions between a UE and a BS.

Figure 2:
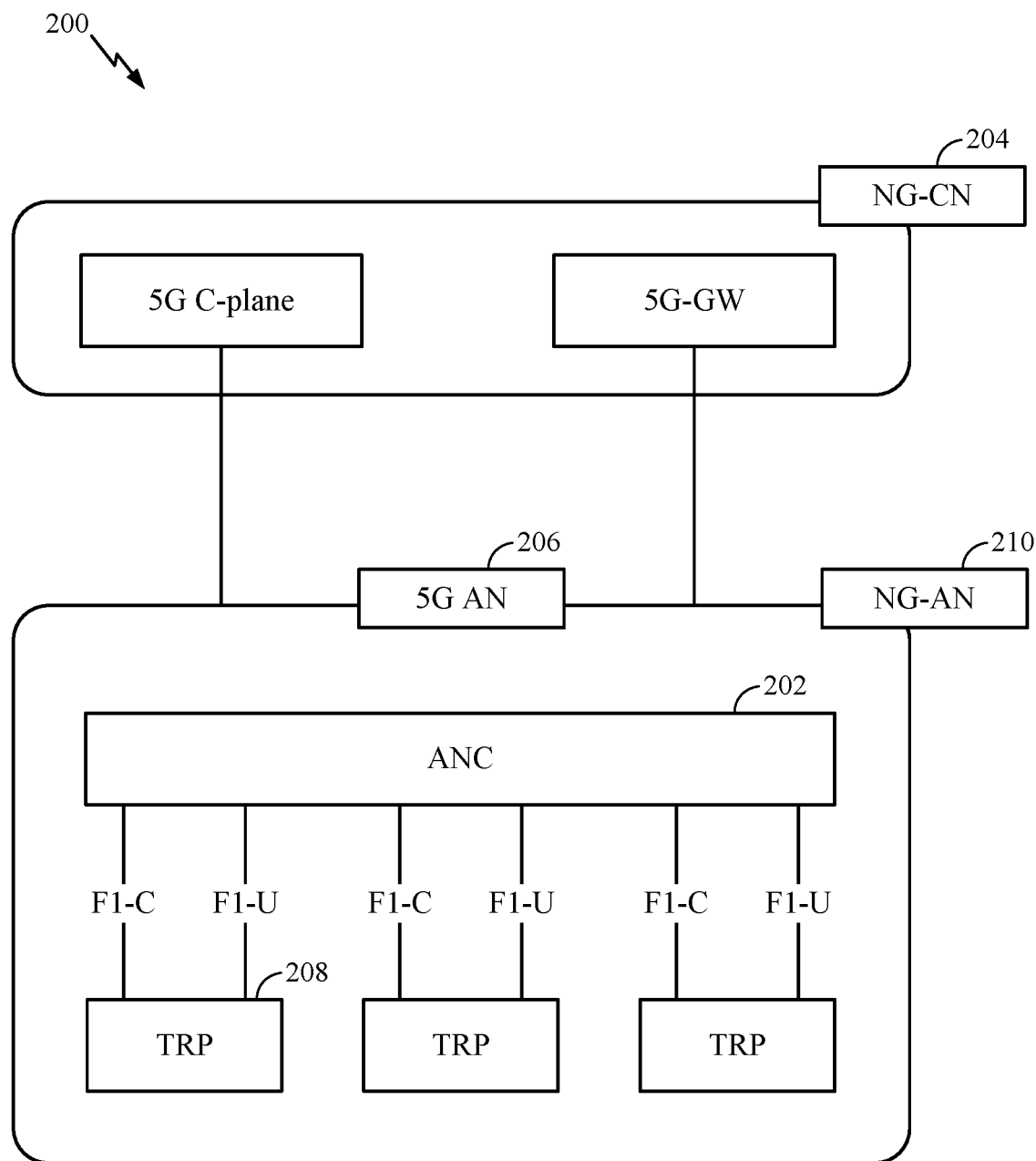
FIG. 2 is a block diagram illustrating an example logical architecture of a distributed radio access network (RAN), in accordance with certain aspects of the present disclosure.

FIG. 2 illustrates an example logical architecture of a distributed Radio Access Network (RAN) 200, which may be implemented in the wireless communication network 100 illustrated in FIG. 1. A 5G access node 206 may include an access node controller (ANC) 202. ANC 202 may be a central unit (CU) of the distributed RAN 200. The backhaul interface to the Next Generation Core Network (NG-CN) 204 may terminate at ANC 202. The backhaul interface to neighboring next generation access Nodes (NG-ANs) 210 may terminate at ANC 202. ANC 202 may include one or more TRPs 208 (e.g., cells, BSs, gNBs, etc.).

The TRPs 208 may be a distributed unit (DU). TRPs 208 may be connected to a single ANC (e.g., ANC 202) or more than one ANC (not illustrated). For example, for RAN sharing, radio as a service (RaaS), and service specific AND deployments, TRPs 208 may be connected to more than one ANC. TRPs 208 may each include one or more antenna ports. TRPs 208 may be configured to individually (e.g., dynamic selection) or jointly (e.g., joint transmission) serve traffic to a UE.

The logical architecture of distributed RAN 200 may support fronthauling solutions across different deployment types. For example, the logical architecture may be based on transmit network capabilities (e.g., bandwidth, latency, and/or jitter).

The logical architecture of distributed RAN 200 may share features and/or components with LTE. For example, next generation access node (NG-AN) 210 may support dual connectivity with NR and may share a common fronthaul for LTE and NR.

The logical architecture of distributed RAN 200 may enable cooperation between and among TRPs 208, for example, within a TRP and/or across TRPs via ANC 202. An inter-TRP interface may not be used.

Logical functions may be dynamically distributed in the logical architecture of distributed RAN 200. The Radio Resource Control (RRC) layer, Packet Data Convergence Protocol (PDCP) layer, Radio Link Control (RLC) layer, Medium Access Control (MAC) layer, and a Physical (PHY) layers may be adaptably placed at the DU (e.g., TRP 208) or CU (e.g., ANC 202).

Figure 3:
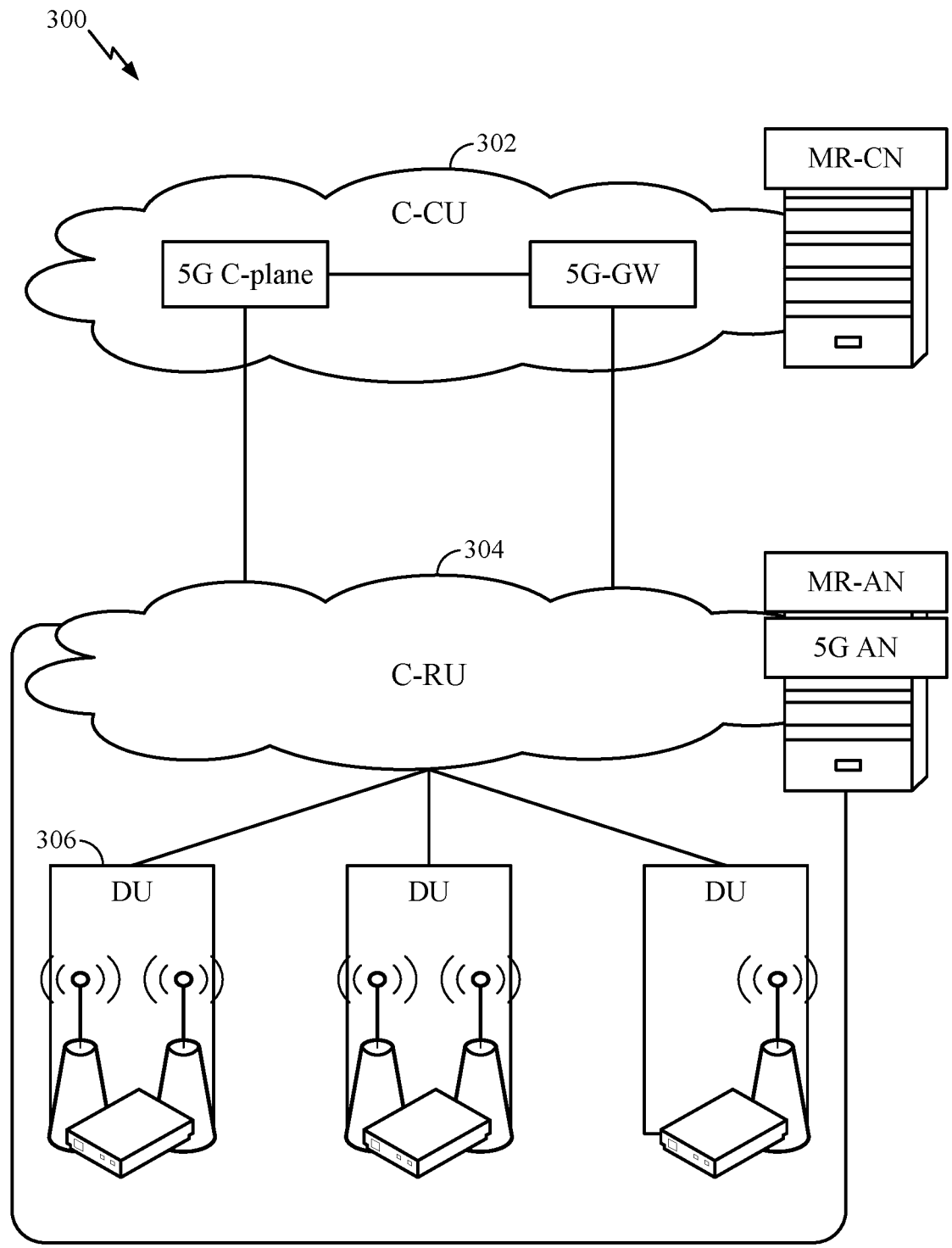
FIG. 3 is a diagram illustrating an example physical architecture of a distributed RAN, in accordance with certain aspects of the present disclosure.

FIG. 3 illustrates an example physical architecture of a distributed RAN 300, according to aspects of the present disclosure. A centralized core network unit (C-CU) 302 may host core network functions. C-CU 302 may be centrally deployed. C-CU 302 functionality may be offloaded (e.g., to advanced wireless services (AWS)), in an effort to handle peak capacity.

A centralized RAN unit (C-RU) 304 may host one or more ANC functions. Optionally, the C-RU 304 may host core network functions locally. The C-RU 304 may have distributed deployment. The C-RU 304 may be close to the network edge.

A DU 306 may host one or more TRPs (Edge Node (EN), an Edge Unit (EU), a Radio Head (RH), a Smart Radio Head (SRH), or the like). The DU may be located at edges of the network with radio frequency (RF) functionality.

Figure 4:
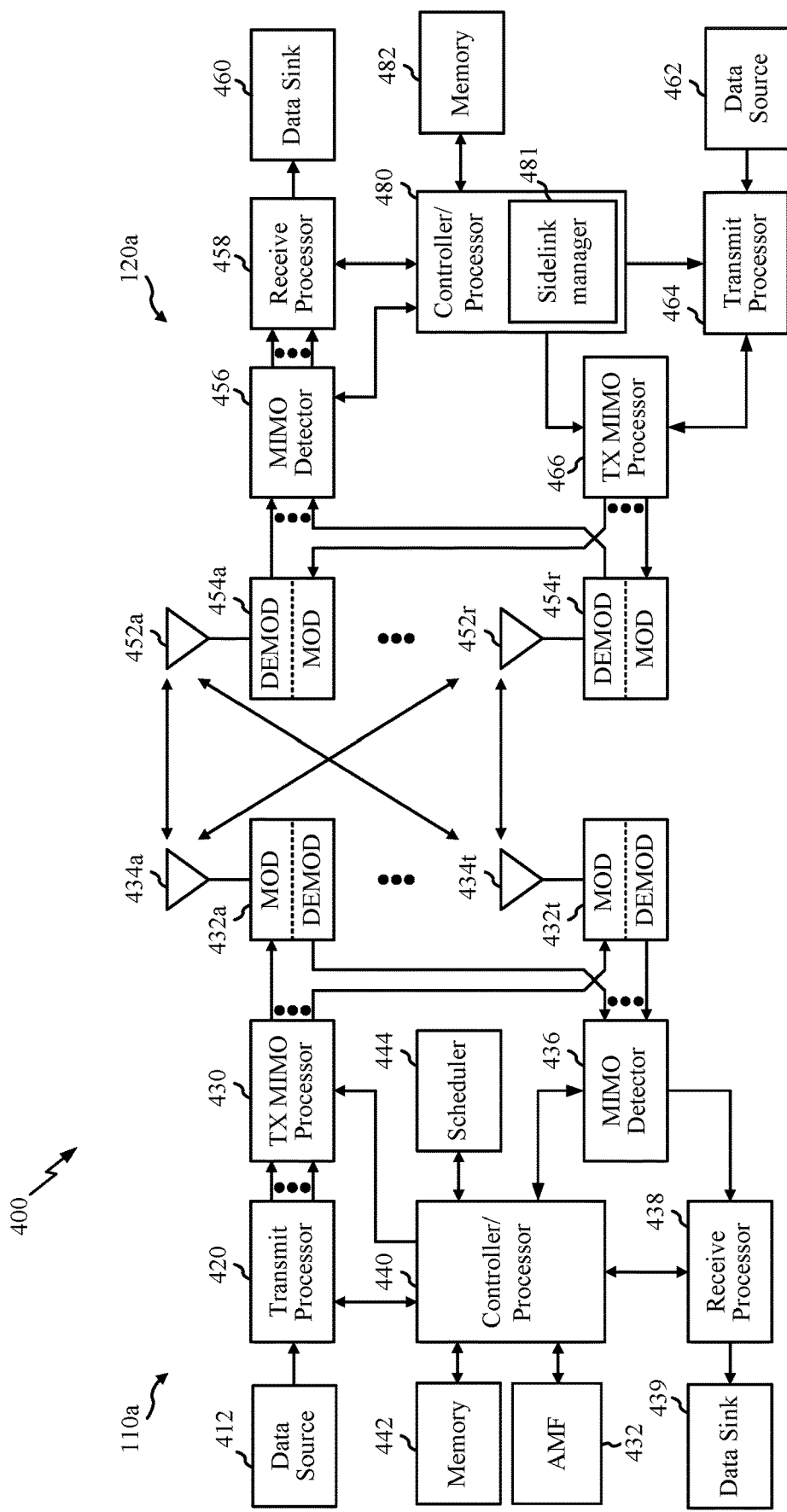
FIG. 4 is a block diagram conceptually illustrating a design of an example base station (BS) and user equipment (UE), in accordance with certain aspects of the present disclosure.

FIG. 4 illustrates example components of BS 110a and UE 120a (as depicted in FIG. 1), which may be used to implement aspects of the present disclosure. For example, antennas 452, processors 466, 458, 464, and/or controller/processor 480 of the UE 120a may be used to perform the various techniques and methods described herein with reference to FIG. 10.

At the BS 110a, a transmit processor 420 may receive data from a data source 412 and control information from a controller/processor 440. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), etc. The data may be for the physical downlink shared channel (PDSCH), etc. The processor 420 may process (e.g., encode and symbol map) the data and control information to obtain data symbols and control symbols, respectively. The processor 420 may also generate reference symbols, e.g., for the primary synchronization signal (PSS), secondary synchronization signal (SSS), and cell-specific reference signal (CRS). A transmit (TX) multiple-input multiple-output (MIMO) processor 430 may perform spatial processing (e.g., precoding) on the data symbols, the control symbols, and/or the reference symbols, if applicable, and may provide output symbol streams to the modulators (MODs) 432a through 432t. Each modulator 432 may process a respective output symbol stream (e.g., for OFDM, etc.) to obtain an output sample stream. Each modulator may further process (e.g., convert to analog, amplify, filter, and upconvert) the output sample stream to obtain a downlink signal. Downlink signals from modulators 432a through 432t may be transmitted via the antennas 434a through 434t, respectively.

At the UE 120a, the antennas 452a through 452r may receive the downlink signals from the base station 110a and may provide received signals to the demodulators (DEMODs) in transceivers 454a through 454r, respectively. Each demodulator 454 may condition (e.g., filter, amplify, downconvert, and digitize) a respective received signal to obtain input samples. Each demodulator may further process the input samples (e.g., for OFDM, etc.) to obtain received symbols. A MIMO detector 456 may obtain received symbols from all the demodulators 454a through 454r, perform MIMO detection on the received symbols if applicable, and provide detected symbols. A receive processor 458 may process (e.g., demodulate, deinterleave, and decode) the detected symbols, provide decoded data for the UE 120a to a data sink 460, and provide decoded control information to a controller/processor 480.

On the uplink, at UE 120a, a transmit processor 464 may receive and process data (e.g., for the physical uplink shared channel (PUSCH)) from a data source 462 and control information (e.g., for the physical uplink control channel (PUCCH) from the controller/processor 480. The transmit processor 464 may also generate reference symbols for a reference signal (e.g., for the sounding reference signal (SRS)). The symbols from the transmit processor 464 may be precoded by a TX MIMO processor 466 if applicable, further processed by the demodulators in transceivers 454a through 454r (e.g., for SC-FDM, etc.), and transmitted to the base station 110a. At the BS 110a, the uplink signals from the UE 120a may be received by the antennas 434, processed by the modulators 432, detected by a MIMO detector 436 if applicable, and further processed by a receive processor 438 to obtain decoded data and control information sent by the UE 120a. The receive processor 438 may provide the decoded data to a data sink 439 and the decoded control information to the controller/processor 440.

The controllers/processors 440 and 480 may direct the operation at the BS 110a and the UE 120a, respectively. The processor 440 and/or other processors and modules at the BS 110a may perform or direct the execution of processes for the techniques described herein. As shown in FIG. 2, the controller/processor 480 of the UE 120a has a sidelink manager 481 that may be configured for transmitting a sidelink communication to another UE. Although shown at the controller/processor 480 and controller/processor 440, other components of the UE 120a and BS 110a may be used performing the operations described herein. The memories 442 and 482 may store data and program codes for BS 110a and UE 120a, respectively. A scheduler 444 may schedule UEs for data transmission on the downlink, sidelink, and/or uplink.

In some circumstances, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks (WLANs), which typically use an unlicensed spectrum).

Figure 5:
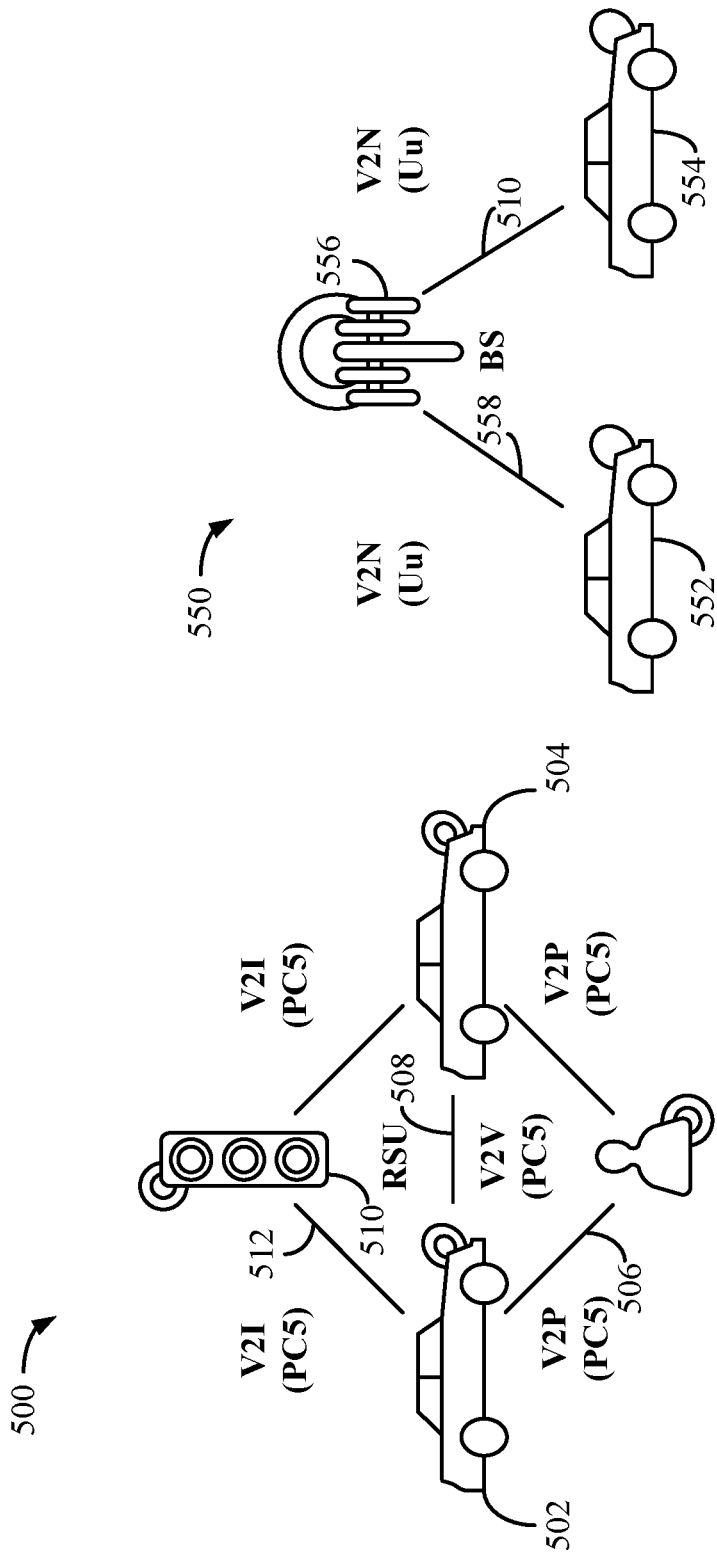
FIGS. 5A and 5B show diagrammatic representations of example vehicle to everything (V2X) systems in accordance with some aspects of the present disclosure.

FIGS. 5A and 5B show diagrammatic representations of example vehicle to everything (V2X) systems in accordance with some aspects of the present disclosure. For example, the vehicles shown in FIGS. 5A and 5B may communicate via sidelink channels and may perform sidelink CSI reporting as described herein.

The V2X systems, provided in FIGS. 5A and 5B provide two complementary transmission modes. A first transmission mode (Mode 1), shown by way of example in FIG. 5A, involves direct communications (for example, also referred to as side link communications) between participants in proximity to one another in a local area. A second transmission mode (Mode 2), shown by way of example in FIG. 5B, involves network communications through a network, which may be implemented over a Uu interface (for example, a wireless communication interface between a radio access network (RAN) and a UE).

Referring to FIG. 5A, a V2X system 500 (for example, including vehicle-to-vehicle (V2V) communications) is illustrated with two vehicles 502, 504. The first transmission mode allows for direct communication between different participants in a given geographic location. As illustrated, a vehicle can have a wireless communication link 506 with an individual (i.e., vehicle to person (V2P), for example, via a UE) through a PC5 interface. Communications between the vehicles 502 and 504 may also occur through a PC5 interface 508. In a like manner, communication may occur from a vehicle 502 to other highway components (for example, roadside service unit 510), such as a traffic signal or sign (i.e., vehicle to infrastructure (V2I)) through a PC5 interface 512. With respect to each communication link illustrated in FIG. 5A, two-way communication may take place between elements, therefore each element may be a transmitter and a receiver of information. The V2X system 500 may be a self-managed system implemented without assistance from a network entity. A self-managed system may enable improved spectral efficiency, reduced cost, and increased reliability as network service interruptions do not occur during handover operations for moving vehicles. The V2X system may be configured to operate in a licensed or unlicensed spectrum, thus any vehicle with an equipped system may access a common frequency and share information. Such harmonized/common spectrum operations allow for safe and reliable operation.

FIG. 5B shows a V2X system 550 for communication between a vehicle 552 and a vehicle 554 through a network entity 556. These network communications may occur through discrete nodes, such as a base station (for example, an eNB or gNB), that sends and receives information to and from (for example, relays information between) vehicles 552, 554. The network communications through vehicle to network (V2N) links 558 and 510 may be used, for example, for long-range communications between vehicles, such as for communicating the presence of a car accident a distance ahead along a road or highway. Other types of communications may be sent by the node to vehicles, such as traffic flow conditions, road hazard warnings, environmental/weather reports, and service station availability, among other examples. Such data can be obtained from cloud-based sharing services.

In some circumstances, two or more subordinate entities (for example, UEs) may communicate with each other using sidelink signals. As described above, V2V and V2X communications are examples of communications that may be transmitted via a sidelink. When a UE is transmitting a sidelink communication on a sub-channel of a frequency band, the UE is typically unable to receive another communication (e.g., another sidelink communication from another UE) in the frequency band. Other applications of sidelink communications may include public safety or service announcement communications, communications for proximity services, communications for UE-to-network relaying, device-to-device (D2D) communications, Internet of Everything (IoE) communications, Internet of Things (IoT) communications, mission-critical mesh communications, among other suitable applications. Generally, a sidelink may refer to a direct link between one subordinate entity (for example, UE1) and another subordinate entity (for example, UE2). As such, a sidelink may be used to transmit and receive a communication (also referred to herein as a "sidelink signal") without relaying the communication through a scheduling entity (for example, a BS), even though the scheduling entity may be utilized for scheduling or control purposes. In some examples, a sidelink signal may be communicated using a licensed spectrum (unlike wireless local area networks, which typically use an unlicensed spectrum).

Various sidelink channels may be used for sidelink communications, including a physical sidelink discovery channel (PSDCH), a physical sidelink control channel (PSCCH), a physical sidelink shared channel (PSSCH), and a physical sidelink feedback channel (PSFCH). The PSDCH may carry discovery expressions that enable proximal devices to discover each other. The PSCCH may carry control signaling such as sidelink resource configurations and other parameters used for data transmissions, and the PSSCH may carry the data transmissions.

For the operation regarding PSSCH, a UE performs either transmission or reception in a slot on a carrier. A reservation or allocation of transmission resources for a sidelink transmission is typically made on a sub-channel of a frequency band for a period of a slot. NR sidelink supports for a UE a case where all the symbols in a slot are available for sidelink, as well as another case where only a subset of consecutive symbols in a slot is available for sidelink.

PSFCH may carry feedback such as channel state information (CSI) related to a sidelink channel quality. A sequence-based PSFCH format with one symbol (not including AGC training period) may be supported. The following formats may be possible: a PSFCH format based on PUCCH format 2 and a PSFCH format spanning all available symbols for sidelink in a slot.

Figure 6:
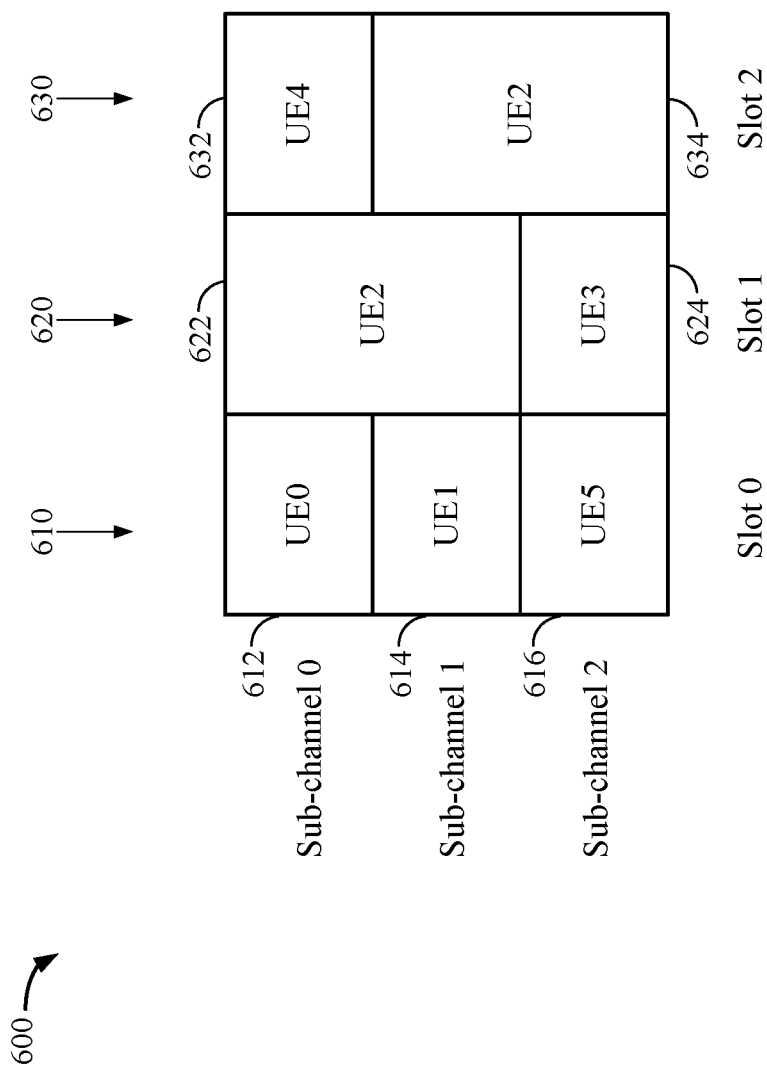
FIG. 6 illustrates an example allocation of a resource pool for sidelink communications, in accordance with certain aspects of the present disclosure.

FIG. 6 is an example of how resources of a common resource pool 600 may be allocated for sidelink communications (broadcast and groupcast device-to-device or D2D) between UEs (e.g., UEs 110, shown in FIG. 1). As noted above, with reference to FIGS. 5A and 5B, sidelink generally refers to the link between two users, or user-relays can be used in different scenarios and for different applications. As previously described, when a UE is transmitting a sidelink communication on a sub-channel of a frequency band, the UE is typically unable to receive another communication (e.g., another sidelink communication from another UE) in the frequency band. Thus, sidelink communications may be referred to as being half-duplex. Thus, UEs 0, 1, and 5, which transmit sidelink communications 612, 614, and 616 respectively, cannot receive the sidelink communications from each other. That is, UE 0 cannot receive the sidelink transmissions 614 and 616. Similarly, UE 2 cannot receive the sidelink transmissions 624 and 632 from UEs 3 and 4, respectively. Also, UE 3 cannot receive sidelink transmission 622 from UE 2, and UE 4 cannot receive the sidelink transmission 634 from UE 2. In aspects of the present disclosure, a sidelink transmission(s) that cannot be received may be referred to as being "erased" for the UE or wireless node that cannot receive the sidelink transmission, because the UE has no information regarding that sidelink transmission. This is unlike other situations in which a UE fails to decode a transmission, because in those situations, the UE may retain some information regarding the transmission that the UE failed to decode, and the UE may combine that retained information with a retransmission that the UE receives to determine the transmission that the UE failed to decode.

According to previously known techniques, resource allocation is reservation based in NR sidelink communications. In these techniques, resource allocations are made in units of sub-channels in the frequency domain and are limited to one slot in the time domain. In the previously known techniques, a transmission may reserve resources in the current slot and in up to two future slots. Reservation information may be carried in sidelink control information (SCI). In the previously known techniques, sidelink control information (SCI) may be transmitted in two stages. A first stage SCI (SCI-1) may be transmitted on a physical sidelink control channel (PSCCH) and contains resource reservation information as well as information needed to decode a second stage SCI (SCI-2). A SCI-2 may be transmitted on the physical sidelink shared channel (PSSCH) and contains information needed to decode data on the shared channel (SCH) and to provide feedback (e.g., acknowledgments (ACKs) or negative acknowledgments (NAKs)) over the physical sidelink feedback channel (PSFCH).

Example Sidelink Sensing and Resource Allocation Enhancement for Power Saving

Aspects of the present disclosure provide techniques that may help allocate resources of a resource pool based on one or more parameters, such as, for example, for half-duplex sidelink communications with assistance of a function. A first UE in sidelink communications with the second UE may use only a fraction of resources in the resource pool based on the one or more parameters. The fraction of resources may be identified using the function having the one or more parameters as inputs. For example, the one or more parameters may include an identifier (ID) of the first (e.g., source, or transmitting) UE and an ID of a second (e.g., target, or receiving/destination) UE, a slot ID (or index), a subchannel index, a frequency index, a channel busy ratio (CBR), mapping to physical sidelink feedback channel (PSFCH), among others.

For convenience of discussion herein, any association or relationship between the one or more parameters and the identification of the fraction of resources are referred to as "function" herein. Further, the fraction or part of resources within the resource pool identified by the function is referred to a number/plurality or a "subset" of resources, with respect to the resource pool. Such annotation does not limit or require the overall resource pool or resource set be fixed or static. In other words, the identification of the subset of resources based on the function may be dynamic, with the function capable to vary based on potentially changing parameters, causing the allocation of subset of resources to change overtime.

As will be described in greater detail below, a first UE may use the function to determine a first subset of resources to use for sidelink transmissions to a second UE and a second subset to receive sidelink transmissions from the second UE. In some cases, the UE may not transmit or receive (or sense the channel) on resources in the resource pool that does not belong to either the first or the second subset. As a result, the UE may be able to either sleep or stop sidelink activity on the time slots on which no subchannels belong to the first set or the second set, which may result in power savings.

As will also be described in greater detail, the function may be common to all UEs and may be designed so that it can be used by all UEs, not only so two UEs in communication agree on the same resources for transmitting and receiving between each other, but also to reduce interference to nearby UEs.

Figure 7:
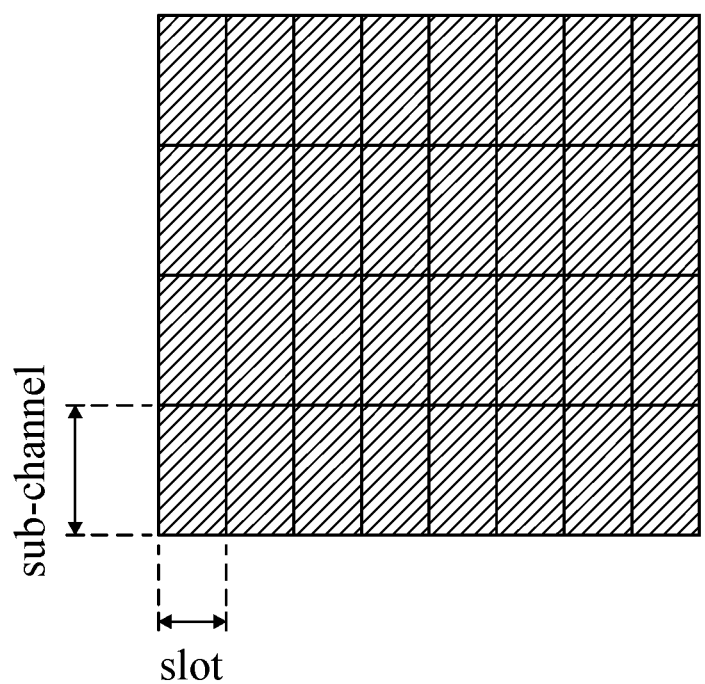
FIG. 7 is an example resource pool for sidelink communication.

FIG. 7 is an example resource pool 700 for sidelink communication. As illustrated, the minimum resource allocation unit is a sub-channel in the frequency domain (i.e., as shown in they axis) and the resource allocation in the time domain is a slot (i.e., as shown in the x axis). For example, depending on subcarrier spacing (SCS) values, and depending on whether a normal cyclic prefix (CP) or an extended CP is used, a slot in the time domain may include 12 or 14 orthogonal frequency division multiplexing (OFDM) symbols.

In the frequency domain, each subchannel may include a set number of consecutive resource blocks (RBs), which may include 12 consecutive subcarriers with the same SCS, such as 10, 15, 20, 25 . . . etc. consecutive RBs depending on practical configuration. Hereinafter, each unit of resource in one slot and in one subchannel is referred to as a resource, or resource unit. For a certain resource pool, the resources therein may be referred to using the coordinates of the slot index (e.g., the $n^{th}$ slot in the x axis of the time domain) and the subchannel index (e.g., the $m^{th}$ subchannel in the y axis of the frequency domain). Interchangeably, the slot index may be referred to as the time index; and the subchannel index may be referred to as the frequency index.

Figure 8:
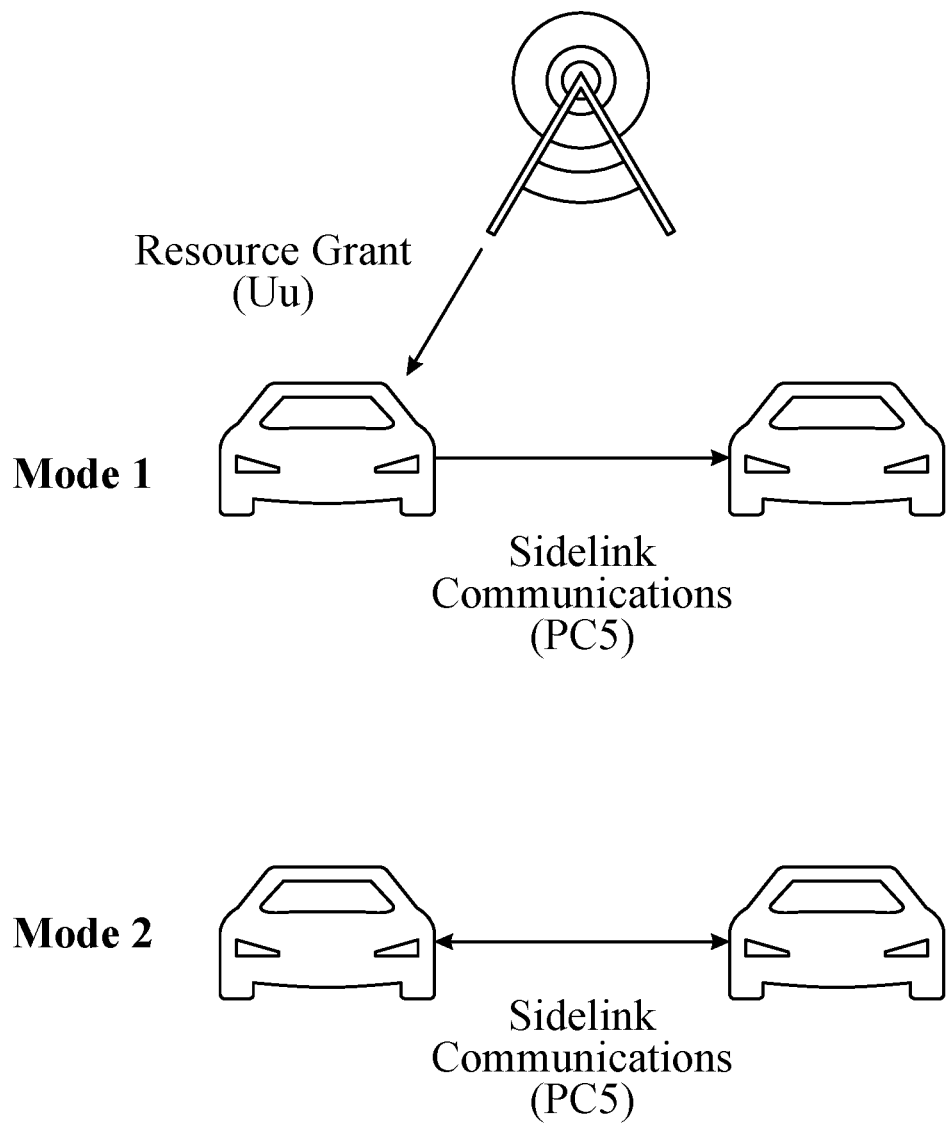
FIG. 8 illustrates two modes of sidelink communication.

FIG. 8 illustrates two modes of resource allocation for sidelink communications, Mode 1 and Mode 2. Mode 1 and Mode 2 are briefly mentioned in FIGS. 5A and 5B and are further discussed with respect to FIG. 8.

In Mode 1 sidelink communication, the sidelink resources are often scheduled by a gNB. In Mode 2 sidelink communication, the UE may autonomously select sidelink resources from a (pre)configured sidelink resource pool(s) based on the channel sensing mechanism. When the UE is in-coverage, a gNB may be configured to adopt Mode 1 or Mode 2. When the UE is out of coverage, only Mode 2 may be adopted.

In Mode 2, when traffic arrives at a transmitting UE, the transmitting UE may select resources for PSCCH and PSSCH, and/or reserve resources for retransmissions to minimize latency. Therefore, in conventional configurations the transmitting UE would select resources for PSSCH associated with PSCCH for initial transmission and blind retransmissions, which incurs unnecessary resources and the related power consumption. To avoid such resource waste and other similar resource duplication/blind reservation/redundancy, the UEs in sidelink communication may communicate, as shown in FIG. 9, to use a subset of the resources.

Figure 9:
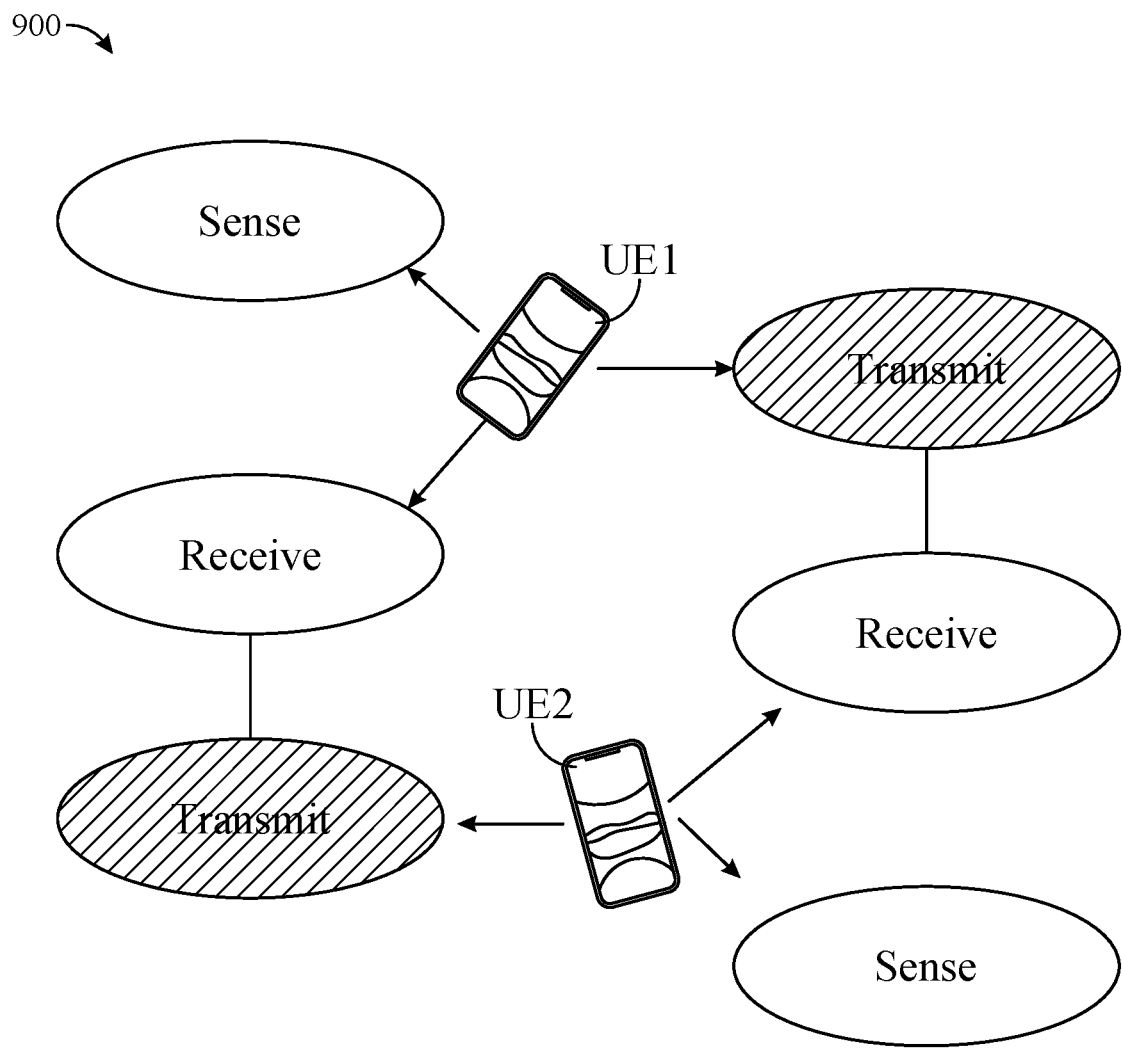
FIG. 9 illustrates two UEs in sidelink communication sharing resources, in accordance with certain aspects of the present disclosure.

Turning to FIG. 9, the various functions UEs have to perform for sidelink communications are shown with an example pair of UEs, UE1 and UE2. UE1 and UE2 share a common set of resources in which UE1 transmits to UE2 and UE2 transmits to UE1.

In such a scenario, when a sidelink has been established between a pair of non-vehicular UEs (e.g., pedestrian UEs or P-UEs), which are battery powered, to distinguish from vehicle UEs, or V-UEs, which have no power consumption concerns), the transmission and reception of the two P-UEs may be aligned and/or coordinated such that UE1 knows the potential transmitting and receiving occasions for UE2 and vice versa, thus avoiding a waste of resources as mentioned above.

As noted above, aspects of the present disclosure provide techniques that may help align and coordinating the resource utilization in the two UEs, the UEs may be prevented from simultaneous transmission (and reception). This way, the two UEs are using overlapping communication resources and reducing blind reception, and the associated power consumption, because the UEs only receive/sense in a selected subset of resources in the resource pool.

Figure 10:
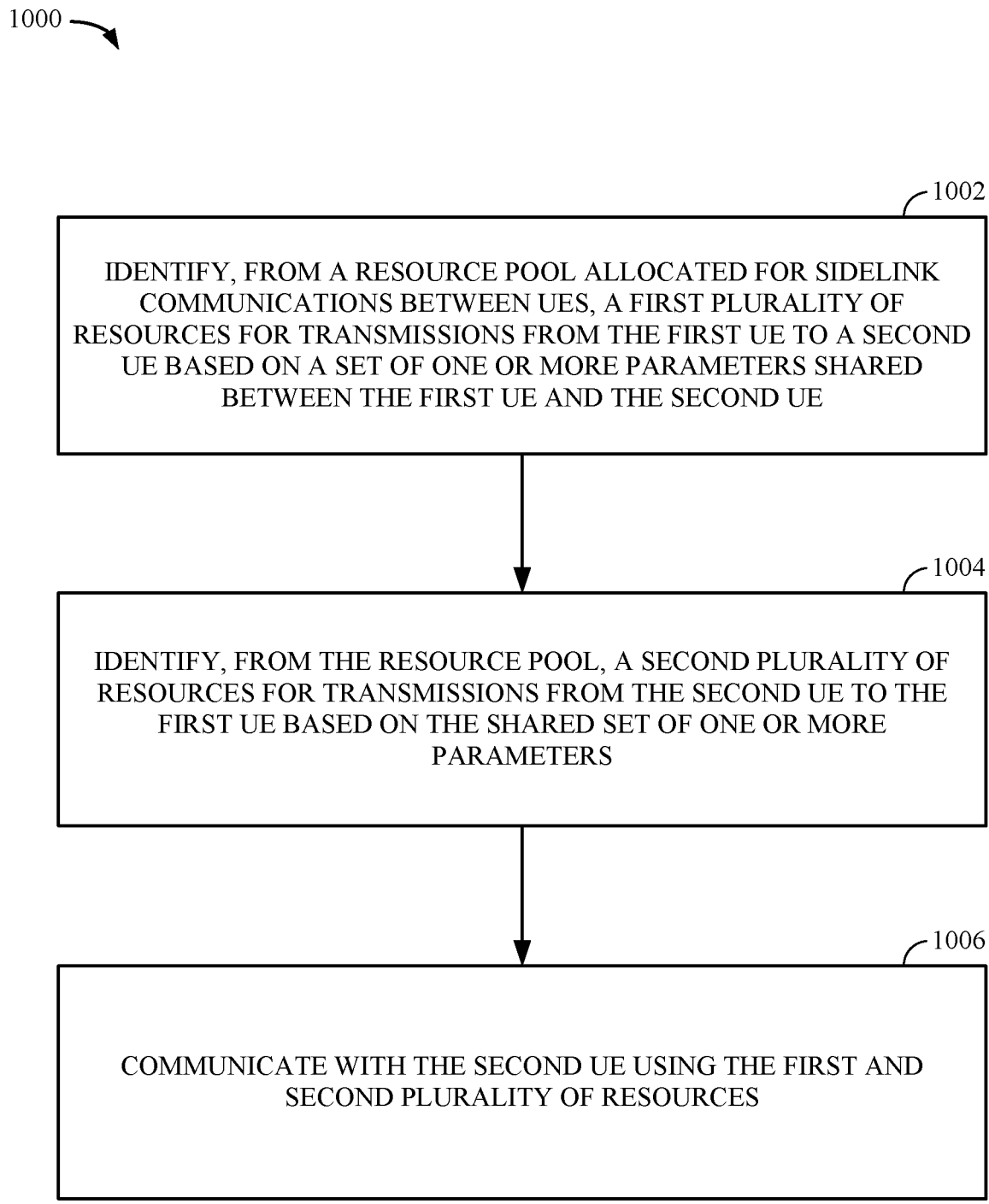
FIG. 10 illustrates example operations for wireless communications by a first UE, in accordance with certain aspects of the present disclosure.

FIG. 10 illustrates example operations 1000 for wireless communications by a first UE, in accordance with certain aspects of the present disclosure. For example, operations 1000 may be performed by a UE 120 of FIG. 1 or FIG. 4 when performing sidelink communications with another UE.

Operations 1000 begin, at 1002, by identifying, from a resource pool allocated for sidelink communications between UEs, a first number (e.g., subset) of resources for transmissions from the first UE to a second UE based on a set of one or more parameters shared between the first UE (UE1) and the second UE (UE2). For example, both UE1 and UE2 share a function, or an association between the shared set of one or more parameters to determine the first number of resources. The function and the one or more parameters are further discussed below.

At 1004, the UE1 identifies, from the resource pool, a second number (e.g., subset) of resources for transmissions from the second UE to the first UE based on the shared set of one or more parameters. Because the function and the one or more parameters are shared among the sidelink UEs (especially UE1 and UE2), both UE1 and UE2 may know which resources in the resource pool belong to the first subset and the second subset, such as by identifying the location/ID/indices of timeslots and subchannels.

At 1006, UE1 communicates with UE2 using the first and the second number of resources. Because not all resources in the resource pool may need be used, UE1 and UE2 may conserve power over time slots not having the first number of resources.

Turning now to the various aspects of the function used, the transmitting and receiving UEs (UE1 and UE2) may use the same function to derive the corresponding sets of resources (i.e., the first number and the second number of resources, or the first subset and the second subset of resources). The function may be defined in a standard and pre-loaded into the various UEs. Because UE1 and UE2 use the same function, they will be in alignment regarding which set of resources to use for transmission from UE1 to UE2, from UE2 to UE1 (and can avoid other resources).

By deriving the first subset of resources and the second subset of resources using a common function at the transmitter and receiver, sidelink communications on time slots on which no subchannels belong to either the first subset or second subset can thus be avoided. As such, both UE1 and UE2 may enter a low power state for at least some of the time slots on which no subchannels belong to either the first subset or second subset for power saving. The chance of collision with other transmissions using the first subset and the second subset is thus smaller than the chance of collision based on random resource selection.

Figure 11:
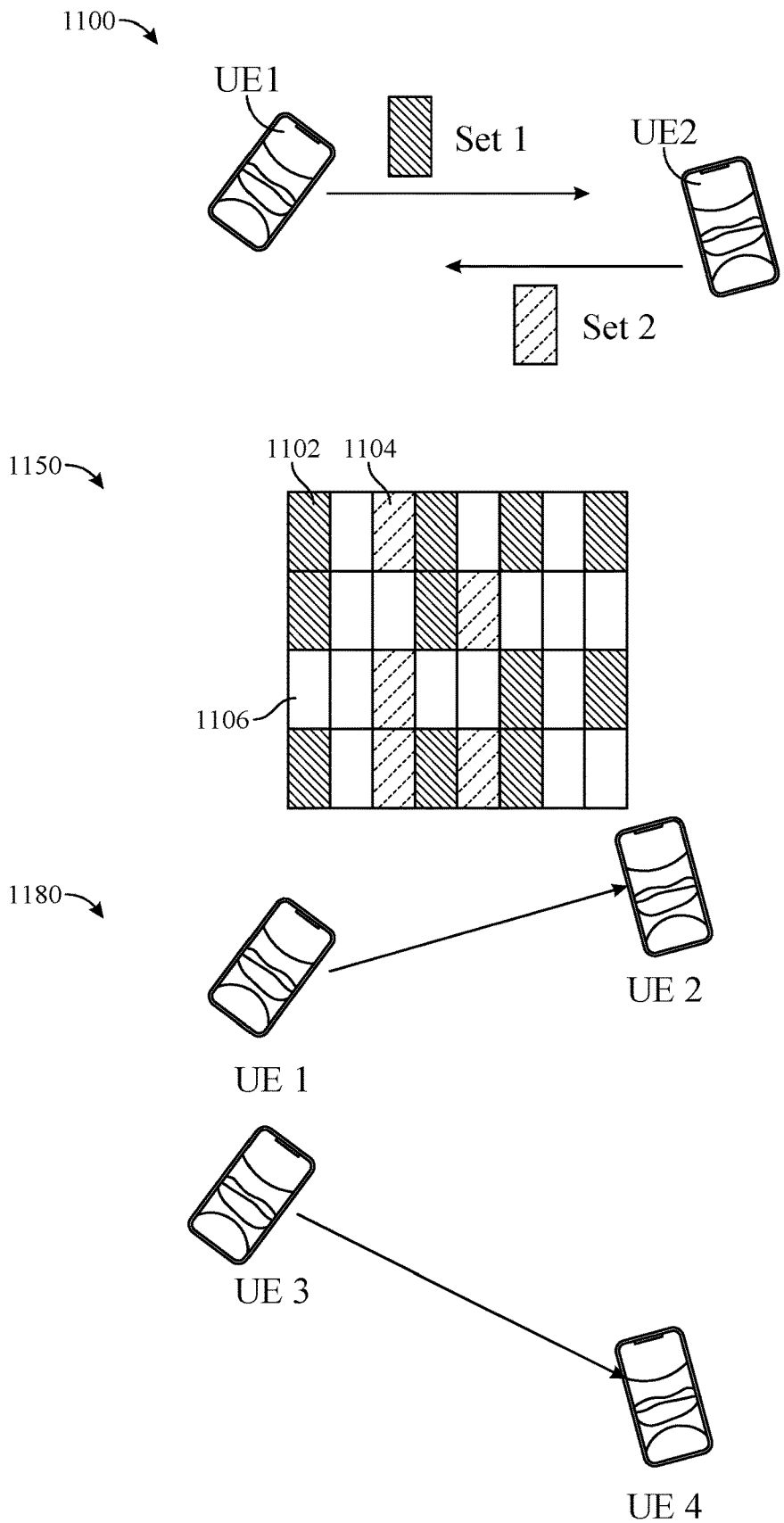
FIG. 11 illustrates example diagrams of resource management for two or more UEs for power saving, in accordance with certain aspects of the present disclosure.

As shown in the scenario 1100 of FIG. 11, UE1 transmits using the first subset of resources to UE2. The first subset of resources is represented in FIG. 11 by a resource (1102) of a color or pattern for illustrative purposes (here, in pink color, if available). UE2 transmits the second subset of resources to UE1, represented by a resource (1104) of a different color or pattern for illustrative purposes (here, in blue color, if available). The respective pink and blue resources (1102 and 1104) are further represented in the resource pool 1150 of FIG. 11. Resources 1106 of sidelink communications on time slots on which no subchannels belong to either the first subset or second subset are represented in a third color or pattern (here, in white, if available).

In some particular implementations, the function may be based on at least a source identifier (ID) and a destination ID. In some cases, the first subset of resources is derived using the function based on an ID of UE1 as the source ID and an ID of UE2 as the destination ID. The second subset of resources is derived using the function based on the ID of UE2 as the source ID and the ID of UE1 as the destination ID. This way, the function can indicate the direction of transmission between UE1 and UE2. In some cases, the function may be designed to ensure that the first subset of resources and the second subset of resources are non-overlapping in time. For example, the function may be designed to provide two different sets of slots based on a comparison between the source ID and the destination ID.

As shown in FIG. 11, the resources 1102 and 1104 may be distinguished based on whether UE1 or UE2 is associated with the source ID or the destination ID. For example, when the UE1 is associated with the source ID, the function may indicate, in both UE1 and UE2, that a specific resource is pink, thus that resource is used by both UEs and given a known transmission direction (from UE1 to UE2). Similarly, when the UE2 is associated with the source ID, the function may indicate, in both UE1 and UE2, that a specific resource is blue, thus that resource is used by both UEs and given a known transmission direction (from UE2 to UE1).

In some embodiments, the function is further based on one or more of a slot ID, a subchannel index, or a frequency index. For example the function may be expressed as:

$$f(source\_ID, destination\_ID, slot\_idx, sub-channel\_idx, traffic\ demands) \in \{0,1\}$$

In the above example function, the common subset(s) of resources used by UE1 and UE2 (i.e., both the first subset and the second subset) is indicated by an output of 1 of the function.

In some embodiments, the function may include two or more component functions, such as respective component functions in time (determining resources time slot) and in frequency (determining resources subchannel). For example, UE1 may first determine that the first number of resources include $N_1$ resources. The $N_1$ resources may be indexed by I, where I is one of $\{0, 1, \ldots, N_1-1\}$. Similarly, UE2 may determine that the second number of resources include $N_2$ resources. The $N_2$ resources may be indexed by J, where J is one of $\{0, 1, \ldots, N_2-1\}$. Both UE1 and UE2 performs the same determination for both subsets of resources.

The function $f$ may then include two component functions in time and frequency: $f=\{f_T, f_F\}$ and outputs a slot index and a subchannel index corresponding to the resource indexed by I or J. For example, the component function $f_T(source_{ID}, dest_{ID}, I, other\ factors)$ may output a slot index for resource I based on the source ID, the destination ID, the index I, and other factors (such as traffic demands and others). The component function $f_F(source_{ID}, dest_{ID}, I, other\ factors)$ may output a subchannel index for the same resource/based on the source ID, the destination ID, the index I, and other factors. Similarly, the slot index and subchannel index can be determined for resource J by substituting I in the function $f$ above.

In some cases, the determination of the first and the second subset of resources may be used in half-duplex applications. For example, only one type of traffic may be allowed if the function outputs 1; while another type of traffic may be allowed if the function outputs 0. As such, this condition may guarantee that the first subset and the second subset are disjoint in time (e.g., mutually exclusive).

In some cases, a value comparison between the source ID and destination ID may determine slot order. For example, if the value of the source ID is greater than the value of the destination ID, then the first subset of resources is used; otherwise, the second subset of resources is used. In such examples, the function may include a component comparing the source ID with the destination ID.

In some cases, channel busy ratios (CBRs) measured at UE1 and/or UE2 may be included in the one or more parameters for consideration of resource allocation. For example, if a measured CBR is high, then the measuring UE may determine a smaller number of resources than without taking CBR into account; otherwise, the measuring UE may determine a larger number of resources. That is, after determining the first number of resources and the second number of resources, UE1 or UE2 may further reduce the number of resources based on CBR.

In some cases, UE1 and UE2 may communicate the respective CBR to each other. The CBRs may be used as input as the one or more parameters for the function to compute, determine, or identify the first and the second subset of resources for UE1 and UE2. In some cases, UE1 may identify the first and the second plurality of resources by performing congestion control based on at least one of the first CBR or the second CBR.

In other words, given a particular source and target, the function can output whether a particular resource of the resource pool (identified by a slot index and sub-channel index) is available for transmission from the source to the target (as indicated by a "1") or is not available (as indicated by a "0").

Put another way, the first subset of resources (for transmission between UE1 and UE2, labeled 1102 in FIG. 11) is the set of resources for which the function outputs a "1" when UE1 is used as the source ID and UE2 is used as the destination ID, while the second subset of resources (for transmission between UE2 and UE1 labeled 1104 in FIG. 11) is the set of resources for which the function outputs a "1" when UE2 is used as the source ID and UE1 is used as the destination ID.

The remaining subset of resources is indicated by the function output of 0 (when UE1 and UE2 are entered as the source/destination IDs), for which the UE1 and UE2 do not spend power. Because the first subset and the second subset of resources are based on the function depending on the slot index, which may employ pseudo-randomization, persistent resource collisions may also be avoided.

In some cases, the function may also consider traffic loading, in order to allocate more resources if there is more traffic to send. To accomplish this, the function may be further based on at least one of: an amount of data for transmission by UE1, an amount of data for transmission by UE2, or a relative amount of data for transmission by the first and second UEs (such as the mentioned traffic demands). In some embodiments, the amount of data for transmission by UE1 may be determined based on the buffer status information of UE1; and the amount of data for transmission by UE2 may be determined based on buffer status information received from UE2. The buffer status information of UE1 may be transmitted to UE2.

In certain aspects, UE1 may identify one or more physical sidelink feedback channel (PSFCH) occasions to monitor based on a mapping of the first subset of resources. UE1 may further identify one or more PSFCH occasions to use for transmitting PSFCH to UE2 based on a mapping of the second subset of resources. For example, when PSFCH is configured, the function $f$ above may be designed such that the resources for transmission and resources for reception (from a single node perspective) map to different PSFCH occasions. As such, UE1 and UE2 may take turns to transmit/receive within different PSFCH occasions or periods.

In some other embodiments, the function may also be designed to reduce interference to nearby UEs. To accomplish this, the function may be further based on location information for at least one of UE1 or UE2. For example, the location information may include a zone ID or the location information could be determined, based on latitude and longitude or Universal Transverse Mercator (UTM) coordinates. In some embodiments, the second subset of resources for transmissions from UE2 are monitored.

In some cases, the function is designed to vary a probability a resource is assigned to the first subset based on traffic loading for UE1 and the function is designed to vary a probability a resource is assigned to the second subset based on traffic loading for UE2. In some embodiments, the information regarding traffic loading with UE2 may be exchanged. For example, UE2 may indicate its buffer status to UE1 using a sidelink BSR (buffer status report) MAC CE or some other signaling. Similarly, UE1 may indicate its buffer status to UE2. This way, both UE1 and UE2 may know what traffic loading information to input to the function to compute the resources. Because the receiving set of resources and the transmitting set of resources depend on the traffic loading of each link (from UE1 to UE2, and from UE2 to UE1), load balance may be achieved.

In some embodiments, as shown in the scenario 1180 of FIG. 11, the function may be designed to assign resources in the resource pool such that, when a third UE (UE3) is near UE1, for example, when the UE3 and UE1 share a common zone ID, then when UE1 transmits, UE3 will not monitor for UE1's transmissions and save power; and when UE3 transmits, UE1 will not monitor for UE3's transmissions. Similarly, if UE3 is communicating with another UE (e.g., UE4) through the side link, then the resource allocation function should be designed such that UE1 and UE4 do not transmit in the same slot, since UE1's transmission would create large interference to UE3 (as the receiver of UE4's transmission).

In some other embodiments, the function may also be based on a pseudo-random number generated based on at least one of the source ID, the destination ID, a slot index, or a subchannel index as input.

Various techniques may be employed to select resources for transmission (e.g., from within the first and second subsets). In one example, resources from the first subset may be randomly selected for transmission to UE2. In another example, sensing on resources of at least one of the first subset of resources or the second subset of resources may be performed to determine a metric, such as, for example, a level of interference (e.g., based on reference signal received power (RSRP) measurement on the received set) of each resource in the transmit set. Resources from the first subset for transmission to UE2 may be selected based on the metric. From the receiver (e.g., UE2) perspective, the receiver may still need to monitor all resources in its receive set (the receive set for UE2 is the transmit set for UE1), since it does not know a priori on which resource(s) UE1 will select for transmission. In both examples, the UEs may support the resource sensing and configure the metric as a parameter of the resource pool. In some embodiments, sensing on resources is only performed in the received set (e.g., partial sensing).

In some cases, resources from the first subset may be randomly selected if the metric satisfies a threshold. For example, the threshold may be measured in controlled conditions or extrapolated or computed based on reference measurements. The threshold may also be specified according applicable specifications. In some other embodiments, signaling may be received indicating whether UE1 is to determine resources randomly or based on an interference level (or other metrics, such as signal-to-noise ratio, signal energy level, among others) of the second subset of resources.

In some cases, sensing on resources (or monitoring resources) of at least one of the first subset of resources or the second subset of resources may include detecting a transmission from another UE on the second subset of resources. If the detected transmission indicates that reserved resources are within the first subset of resources, a metric for the reserved resources may then be determined based on a transmission. In some embodiments, if a reservation is detected, and the reserved resource falls in the transmit resource set, then the UE may determine the interference level for the reserved resource based on measurement of RSRP of the reception of the detected grant and data transmission on the detected transmission.

Figure 12:
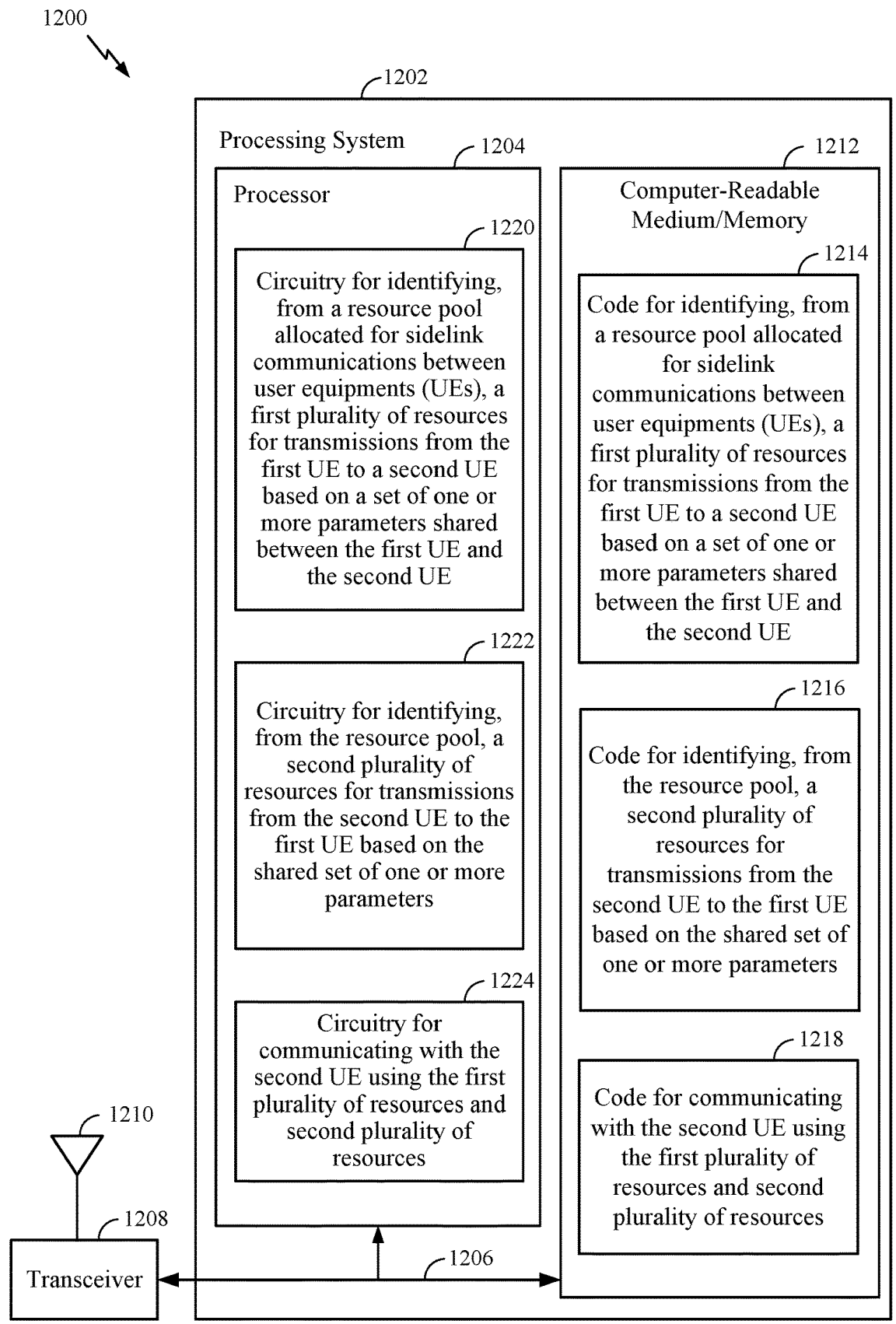
FIG. 12 illustrates a communications device that may include various components configured to perform the operations illustrated in FIG. 10, in accordance with certain aspects of the present disclosure.

FIG. 12 illustrates a communications device 1200 that may include various components (e.g., corresponding to means-plus-function components) configured to perform operations for the techniques disclosed herein, such as the operations 1000 illustrated in FIG. 10. The communications device 1200 includes a processing system 1202 coupled to a transceiver 1208. The transceiver 1208 is configured to transmit and receive signals for the communications device 1200 via an antenna 1210, such as the various signals as described herein. The processing system 1202 may be configured to perform processing functions for the communications device 1200, including processing signals received and/or to be transmitted by the communications device 1200.

The processing system 1202 includes a processor 1204 coupled to a computer-readable medium/memory 1212 via a bus 1206. In certain aspects, the computer-readable medium/memory 1212 is configured to store instructions (e.g., computer-executable code) that when executed by the processor 1204, cause the processor 1204 to perform the operations 1000 illustrated in FIG. 10, or other operations for recovering a sidelink communication that is missed by a wireless node due to the wireless node transmitting while the sidelink communication is occurring. In certain aspects, computer-readable medium/memory 1212 stores code 1214 for identifying, from a resource pool allocated for sidelink communications between user equipments (UEs), a first plurality of resources for transmissions from the first UE to a second UE based on a set of one or more parameters shared between the first UE and the second UE; code 1216 for identifying, from the resource pool, a second plurality of resources for transmissions from the second UE to the first UE based on the shared set of one or more parameters; and code 1218 for communicating with the second UE using the first plurality of resources and the second plurality of resources.

In certain aspects, the processor 1204 has circuitry configured to implement the code stored in the computer-readable medium/memory 1212. The processor 1204 includes circuitry 1220 for identifying, from a resource pool allocated for sidelink communications between user equipments (UEs), a first plurality of resources for transmissions from the first UE to a second UE based on a set of one or more parameters shared between the first UE and the second UE; circuitry 1222 for identifying, from the resource pool, a second plurality of resources for transmissions from the second UE to the first UE based on the shared set of one or more parameters, and circuitry 1224 for communicating with the second UE using the first plurality of resources and the second plurality of resources.

EXAMPLE ASPECTS

Aspect 1: A method for wireless communication by a first user equipment (UE), comprising: identifying, from a resource pool allocated for sidelink communications between UEs, a first plurality of resources for transmissions from the first UE to a second UE based on a set of one or more parameters shared between the first UE and the second UE; identifying, from the resource pool, a second plurality of resources for transmissions from the second UE to the first UE based on the shared set of one or more parameters; and communicating with the second UE using the first plurality of resources and the second plurality of resources.

Aspect 2: The method of Aspect 1, wherein the first plurality of resources and the second plurality of resources are identified using a function having the one or more parameters as inputs.

Aspect 3: The method of Aspect 1, further comprising limiting sidelink communications between the first UE and second UE to time slots on which subchannels belong to either the first or the second plurality of resources.

Aspect 4: The method of Aspect 3, further comprising entering a low power state for at least some of the time slots on which no subchannels belong to either the first plurality of resources or second plurality of resources.

Aspect 5: The method of Aspect 1, wherein the one or more parameters comprise at least a source identifier (ID) and a destination ID.

Aspect 6: The method of Aspect 5, wherein: the first plurality of resources is derived using the shared set of one or more parameters based on an ID of the first UE as the source ID and an ID of the second UE as the destination ID; and the second plurality of resources of resources is derived using the shared set of one or more parameters based on the ID of the second UE as the source ID and the ID of the first UE as the destination ID.

Aspect 7: The method of Aspect 5, wherein the one or more parameters further comprise one or more of a slot ID, a subchannel index, or a frequency index.

Aspect 8: The method of Aspect 1, wherein the one or more parameters comprise at least one of a first channel busy ratio (CBR) measured at the first UE or a second CBR measured at the second UE.

Aspect 9: The method of Aspect 8, further comprising transmitting, by the first UE, the first CBR to the second UE.

Aspect 10: The method of Aspect 8, wherein identifying the first and the second plurality of resources comprises performing congestion control based on at least one of the first CBR or the second CBR.

Aspect 11: The method of Aspect 1, further comprising: identifying one or more first physical sidelink feedback channel (PSFCH) occasions to monitor based on a mapping of the first plurality of resources; and identifying one or more second PSFCH occasions to use for transmitting PSFCH to the second UE based on a mapping of the second plurality of resources.

Aspect 12: The method of Aspect 11, wherein the one or more first PSFCH occasions do not overlap in time with the one or more second PSFCH occasions.

Aspect 13: The method of Aspect 5, wherein the one or more parameters further comprise at least one of: an amount of data for transmission by the first UE, an amount of data for transmission by the second UE, or a relative amount of data for transmission by the first and second UEs.

Aspect 14: The method of Aspect 13, further comprising at least one of: determining the amount of data for transmission by the first UE based on buffer status information of the first UE; determining the amount of data for transmission by the second UE based on buffer status information received from the second UE; or transmitting, to the second UE, the buffer status information of the first UE.

Aspect 15: The method of Aspect 5, wherein the one or more parameters further comprise location information for at least one of the first UE or the second UE, wherein the location information comprises a zone ID.

Aspect 16: The method of Aspect 1, wherein identifying the second plurality of resources comprises monitoring the second plurality of resources for transmissions from the second UE.

Aspect 17: The method of Aspect 1, further comprising randomly selecting resources from the first plurality of resources for transmission to the second UE.

Aspect 18: The method of Aspect 1, further comprising: performing sensing on resources of at least one of the first plurality of resources or the second plurality of resources to determine a metric; and selecting resources from the first plurality of resources for transmission to the second UE based on the metric.

Aspect 19: The method of Aspect 18, wherein the selecting comprises randomly selecting resources from the first plurality of resources if the metric satisfies a threshold.

Aspect 20: The method of Aspect 18, further comprising receiving signaling indicating whether the first UE is to determine resources randomly or based on an interference level of the second plurality of resources.

Aspect 21: The method of Aspect 18, wherein the sensing comprises: detecting a transmission from another UE on the second plurality of resources; and if the detected transmission indicates reserved resources within the first plurality of resources, determining a metric for the reserved resources based on a transmission.

Aspect 22: The method of Aspect 2, wherein the function is designed to ensure the first plurality of resources and the second plurality of resources are non-overlapping in time.

Aspect 23: The method of Aspect 22, wherein: the function is based on at least a source identifier (ID) and a destination ID; and the function is designed to provide two different sets of slots based on a comparison between the source ID and the destination ID.

Aspect 24: The method of Aspect 2, wherein: the function is designed to vary a probability a resource is assigned to the first plurality of resources based on traffic loading for the first UE; and the function is designed to vary a probability a resource is assigned to the second plurality of resources based on traffic loading for the second UE.

Aspect 25: The method of Aspect 2, wherein the function is designed to assign resources in the resource pool such that, if a third UE is near the first UE: when the first UE transmits, the third UE is not to monitor for transmissions; and when the third UE transmits, the first UE is not to monitor for transmissions.

Aspect 26: The method of Aspect 2, wherein: the function is based on at least a source identifier (ID) and a destination ID; and the function is also based on a pseudo-random number generated based on at least one of the source ID, the destination ID, a slot index, or a subchannel index as input.

Aspect 27: An apparatus for wireless communication by a first user equipment (UE), comprising: means for identifying, from a resource pool allocated for sidelink communications between UEs, a first plurality of resources for transmissions from the first UE to a second UE based on a set of one or more parameters shared between the first UE and the second UE; means for identifying, from the resource pool, a second plurality of resources for transmissions from the second UE to the first UE based on the shared set of one or more parameters; and means for communicating with the second UE using the first plurality of resources and the second plurality of resources.

Aspect 28: An apparatus for wireless communication by a first user equipment (UE), comprising: a memory; and at least one processor coupled to the memory, the at least one processor configured to: identify, from a resource pool allocated for sidelink communications between UEs, a first plurality of resources for transmissions from the first UE to a second UE based on a set of one or more parameters shared between the first UE and the second UE; identify, from the resource pool, a second plurality of resources for transmissions from the second UE to the first UE based on the shared set of one or more parameters; and communicate with the second UE using the first plurality of resources and the second plurality of resources.

Aspect 29: The apparatus of Aspect 28, wherein the at least one processor is further configured to use a function having the one or more parameters as inputs to identify the first plurality of resources and the second plurality of resources.

Aspect 30: A non-transitory computer readable medium storing instructions that when executed by a user equipment (UE) cause the UE to: identify, from a resource pool allocated for sidelink communications between UEs, a first plurality of resources for transmissions from the first UE to a second UE based on a set of one or more parameters shared between the first UE and the second UE; identify, from the resource pool, a second plurality of resources for transmissions from the second UE to the first UE based on the shared set of one or more parameters; and communicating with the second UE using the first plurality of resources and the second plurality of resources.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components. For example, various operations shown in FIG. 10 may be performed by various processors shown in FIG. 4, such as processors 466, 458, 464, and/or controller/processor 480 of the UE 120*a*.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For example, instructions for performing the operations 1000 described herein and illustrated in FIG. 10.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method for wireless communication by a first user equipment (UE), comprising:
   identifying, from a resource pool allocated for sidelink communications between UEs, a first plurality of resources for transmissions from the first UE to a second UE based on a set of one or more parameters shared between the first UE and the second UE;
   identifying, from the resource pool, a second plurality of resources for transmissions from the second UE to the first UE based on the shared set of one or more parameters;

communicating with the second UE using the first plurality of resources and the second plurality of resources in a plurality of time slots; and entering a low power state for at least some of the time slots in which no subchannels belong to either the first plurality of resources or second plurality of resources.

2. The method of claim 1, wherein the first plurality of resources and the second plurality of resources are identified using a function having the one or more parameters as inputs.

3. The method of claim 1, wherein communicating with the second UE is limited to the time slots on which subchannels belong to either the first plurality of resources or the second plurality of resources.

4. The method of claim 1, wherein the one or more parameters comprise at least a source identifier (ID) and a destination ID.

5. The method of claim 4, wherein:
the first plurality of resources is derived using the shared set of one or more parameters based on an ID of the first UE as the source ID and an ID of the second UE as the destination ID; and
the second plurality of resources of resources is derived using the shared set of one or more parameters based on the ID of the second UE as the source ID and the ID of the first UE as the destination ID.

6. The method of claim 4, wherein the one or more parameters further comprise one or more of a slot ID, a subchannel index, or a frequency index.

7. The method of claim 1, wherein the one or more parameters comprise at least one of a first channel busy ratio (CBR) measured at the first UE or a second CBR measured at the second UE.

8. The method of claim 7, further comprising transmitting, by the first UE, the first CBR to the second UE.

9. The method of claim 7, wherein identifying the first and the second plurality of resources comprises performing congestion control based on at least one of the first CBR or the second CBR.

10. The method of claim 1, further comprising:
identifying one or more first physical sidelink feedback channel (PSFCH) occasions to monitor based on a mapping of the first plurality of resources; and
identifying one or more second PSFCH occasions to use for transmitting PSFCH to the second UE based on a mapping of the second plurality of resources.

11. The method of claim 10, wherein the one or more first PSFCH occasions do not overlap in time with the one or more second PSFCH occasions.

12. The method of claim 4, wherein the one or more parameters further comprise at least one of: an amount of data for transmission by the first UE, an amount of data for transmission by the second UE, or a relative amount of data for transmission by the first and second UEs.

13. The method of claim 12, further comprising at least one of:
determining the amount of data for transmission by the first UE based on buffer status information of the first UE;
determining the amount of data for transmission by the second UE based on buffer status information received from the second UE; or
transmitting, to the second UE, the buffer status information of the first UE.

14. The method of claim 4, wherein the one or more parameters further comprise location information for at least one of the first UE or the second UE, wherein the location information comprises a zone ID.

15. The method of claim 1, wherein identifying the second plurality of resources comprises monitoring the second plurality of resources for transmissions from the second UE.

16. The method of claim 1, further comprising randomly selecting resources from the first plurality of resources for transmission to the second UE.

17. The method of claim 1, further comprising:
performing sensing on resources of at least one of the first plurality of resources or the second plurality of resources to determine a metric; and
selecting resources from the first plurality of resources for transmission to the second UE based on the metric.

18. The method of claim 17, wherein the selecting comprises randomly selecting resources from the first plurality of resources if the metric satisfies a threshold.

19. The method of claim 17, further comprising receiving signaling indicating whether the first UE is to determine resources randomly or based on an interference level of the second plurality of resources.

20. The method of claim 17, wherein the sensing comprises:
detecting a transmission from another UE on the second plurality of resources; and
if the detected transmission indicates reserved resources within the first plurality of resources, determining a metric for the reserved resources based on a transmission.

21. The method of claim 2, wherein the function is designed to ensure the first plurality of resources and the second plurality of resources are non-overlapping in time.

22. The method of claim 21, wherein:
the function is based on at least a source identifier (ID) and a destination ID; and
the function is designed to provide two different sets of slots based on a comparison between the source ID and the destination ID.

23. The method of claim 2, wherein:
the function is designed to vary a probability a resource is assigned to the first plurality of resources based on traffic loading for the first UE; and
the function is designed to vary a probability a resource is assigned to the second plurality of resources based on traffic loading for the second UE.

24. The method of claim 2, wherein the function is designed to assign resources in the resource pool such that, if a third UE is near the first UE:
when the first UE transmits, the third UE is not to monitor for transmissions; and
when the third UE transmits, the first UE is not to monitor for transmissions.

25. The method of claim 2, wherein:
the function is based on at least a source identifier (ID) and a destination ID; and
the function is also based on a pseudo-random number generated based on at least one of the source ID, the destination ID, a slot index, or a subchannel index as input.

26. An apparatus for wireless communication by a first user equipment (UE), comprising:
means for identifying, from a resource pool allocated for sidelink communications between UEs, a first plurality of resources for transmissions from the first UE to a second UE based on a set of one or more parameters shared between the first UE and the second UE;

means for identifying, from the resource pool, a second plurality of resources for transmissions from the second UE to the first UE based on the shared set of one or more parameters;

means for communicating with the second UE using the first plurality of resources and the second plurality of resources in a plurality of time slots; and means for entering a low power state for at least some of the time slots in which no subchannels belong to either the first plurality of resources or second plurality of resources.

27. An apparatus for wireless communication by a first user equipment (UE), comprising:
- a memory comprising processor-executable instructions; and
- a processor configured to execute the processor-executable instructions and cause the apparatus to:
  - identify, from a resource pool allocated for sidelink communications between UEs, a first plurality of resources for transmissions from the first UE to a second UE based on a set of one or more parameters shared between the first UE and the second UE;
  - identify, from the resource pool, a second plurality of resources for transmissions from the second UE to the first UE based on the shared set of one or more parameters;
  - communicate with the second UE using the first plurality of resources and the second plurality of resources in a plurality of time slots; and
  - enter a low power state for at least some of the time slots in which no subchannels belong to either the first plurality of resources or second plurality of resources.

28. The apparatus of claim 27, wherein the processor is further configured to use a function having the one or more parameters as inputs to identify the first plurality of resources and the second plurality of resources.

29. A non-transitory computer readable medium storing instructions that, when executed by a processor of a first user equipment (UE), cause the first UE to:
- identify, from a resource pool allocated for sidelink communications between UEs, a first plurality of resources for transmissions from the first UE to a second UE based on a set of one or more parameters shared between the first UE and the second UE;
- identify, from the resource pool, a second plurality of resources for transmissions from the second UE to the first UE based on the shared set of one or more parameters; and
- communicate with the second UE using the first plurality of resources and the second plurality of resources in a plurality of time slots; and
- enter a low power state for at least some of the time slots in which no subchannels belong to either the first plurality of resources or second plurality of resources.

* * * * *